(12) United States Patent
Heil

(10) Patent No.: US 6,895,480 B2
(45) Date of Patent: May 17, 2005

(54) APPARATUS AND METHOD FOR SHARING BOOT VOLUME AMONG SERVER BLADES

(75) Inventor: Thomas Heil, Fort Collins, CO (US)

(73) Assignee: LSI Logic Corporation, Milpitas, CA (US)

(*) Notice: Subject to any disclaimer, the term of this patent is extended or adjusted under 35 U.S.C. 154(b) by 276 days.

(21) Appl. No.: 10/315,434

(22) Filed: Dec. 10, 2002

(65) Prior Publication Data
US 2004/0111559 A1 Jun. 10, 2004

(51) Int. Cl.$^7$ .............................................. G06F 13/14
(52) U.S. Cl. ...................................................... 711/153
(58) Field of Search ................................ 711/112, 147, 711/153; 713/2

(56) References Cited

U.S. PATENT DOCUMENTS 6,532,538 B1 * 3/2003 Cronk et al. .................... 713/2

* cited by examiner

Primary Examiner—Kevin L. Ellis
(74) Attorney, Agent, or Firm—Suiter West PC LLO

(57) ABSTRACT

An apparatus and method for sharing a boot volume among server blades. The shared boot volume may be a single drive or a RAID volume. The shared boot volume is first partitioned into boot slices. Next, individual boot slices of the shared boot volume are correlated with individual server blades, which share the shared boot volume. When a boot slice is correlated with a server blade, the boot slice is presented to the server blade, and the server blade sees the boot slice and only the boot slice, and owns the boot slice. This correlation is transparent to the OS or applications on a given server blade, because the I/O controller masks all boot slices but the one owned by that server blade. As far as OS and applications are concerned, the server blade just has a single boot slice as a dedicated local drive.

24 Claims, 5 Drawing Sheets

APPARATUS AND METHOD FOR SHARING BOOT VOLUME AMONG SERVER BLADES

FIELD OF THE INVENTION

This invention relates generally to data centers, and particularly to an apparatus and method for sharing a boot volume among server blades.

BACKGROUND OF THE INVENTION

Server blades are rapidly becoming popular in data center technology. A server blade is basically a server on a card, i.e., a single motherboard that contains a full computer system, including processor(s), memory, network connections and associated electronics. Typically, power, cooling, network access, and storage are not contained on the server blade. Instead, these necessary resources, which may be shared among a collection of server blades, are accessed through the backplane of a chassis, or enclosure; that is, the power and bus connections are a part of the cabinet that houses the collection of server blades.

Server blades are more cost effective than their rack-optimized predecessors for several reasons. Cost is reduced by sharing common resources such as power supplies. Network access for all server blades in a chassis reduces cabling complexity and allows for relocation of server resources. Server blades may also be pre-packed with software, thus reducing the cost of deploying applications. Furthermore, server blades may be managed far more effectively than independent rack-mounted or standalone pedestal servers. For example, using server blades, a data center administrator may install and cable the chassis only; the individual server blades do not require cabling. Thus, adding new computer resources is as easy as plugging in a new server blade, similar to adding a hard drive. Moreover, each server blade runs its own instance of the operating system. Consequently, data center administrators may designate individual server blades for different applications or end users, and may insert or remove (hot plug) these individual server blades without affecting the operation of other server blades in the same chassis.

To maximize the density of server blades, individual server blades typically have no or minimal input/output (I/O). For example, in server blade environments, storage typically is not contained on the server blade, and is centralized instead on a SAN (Storage Area Network) or LAN (Local Area Network). Individual server blades access storage typically via Ethernet and/or Fibre Channel links that are part of the chassis backplane. One of the key impediments, however, is that even though techniques for locating data on SAN or LAN based storage are well-known, each server blade still requires at least one local disk drive for boot, operating system (OS), and pagefile. Additionally, to ensure that the server blade remains available in case the boot drive fails, conventional server blade architectures employ RAID 1 (Redundant Array of Independent Disks 1) mirroring to the boot drive, resulting in a minimum of two drives for each server blade. It is not uncommon for a single, fully populated rack to house tens to hundreds of server blades, requiring twice that number of disk drives. Two drives per server blade not only are expensive, but also consume significant volume and power.

One approach utilized to solve this problem is the concept of "diskless server blades." A diskless server blade boots from a dedicated virtual boot drive on the SAN. This virtual drive may be a slice of a large SAN-based RAID volume (e.g., RAID 1 drive pair), which might be partitioned into hundreds of virtual boot drives, each mapped to a specific server blade. The problem with diskless server blades, however, is that the current operating systems and applications assume that boot/page file storage is closely coupled to the server blade. Moreover, when hundreds of server blades compete for access to the same physical resources, boot/page performance may be severely compromised, resulting in unpredictable latency.

Thus, it would be desirable to have an apparatus and method that resolve the tension between two fundamentally conflicting objectives: the desire to reduce the number of drives, and associated real estate and power consumption in a chassis housing multiple server blades, and the desire to maintain compatibility with operating systems and applications, which assume closely coupled "per server" storage, and which depend upon this close coupling to function.

SUMMARY OF THE INVENTION

Accordingly, the present invention is directed to an apparatus and method for sharing a boot volume, for example, a boot drive or a boot RAID volume, among server blades.

According to one aspect of the present invention, a shared boot volume may first be partitioned into boot slices. The shared boot volume may be a single drive or a RAID volume. The RAID volume may be of any RAID configuration. For example, the RAID volume may be a RAID 1 drive pair so as to take advantage of mirroring to tolerate drive failures. The boot volume may be located on a server blade in the chassis or on the backplane of the chassis. The boot volume may also be built into a separate "boot storage blade". Next, individual boot slices of the shared boot volume may be correlated with individual server blades, which share the shared boot volume. When a boot slice is correlated with a server blade, the boot slice is presented to the server blade, the server blade sees the boot slice and only the boot slice, and the server blade owns the boot slice. This correlation is transparent to the OS or applications on a given server blade, because the I/O controller masks all boot slices but the one owned by that server blade. As far as OS and applications are concerned, the server blade just has a single boot slice as a dedicated local drive.

According to an additional aspect of the present invention, an exemplary apparatus for sharing a boot volume among server blades may be comprised of a backplane into which the server blades are inserted; a boot volume partitioned into boot slices; and an I/O controller which correlates an individual boot slice with an individual server blade.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
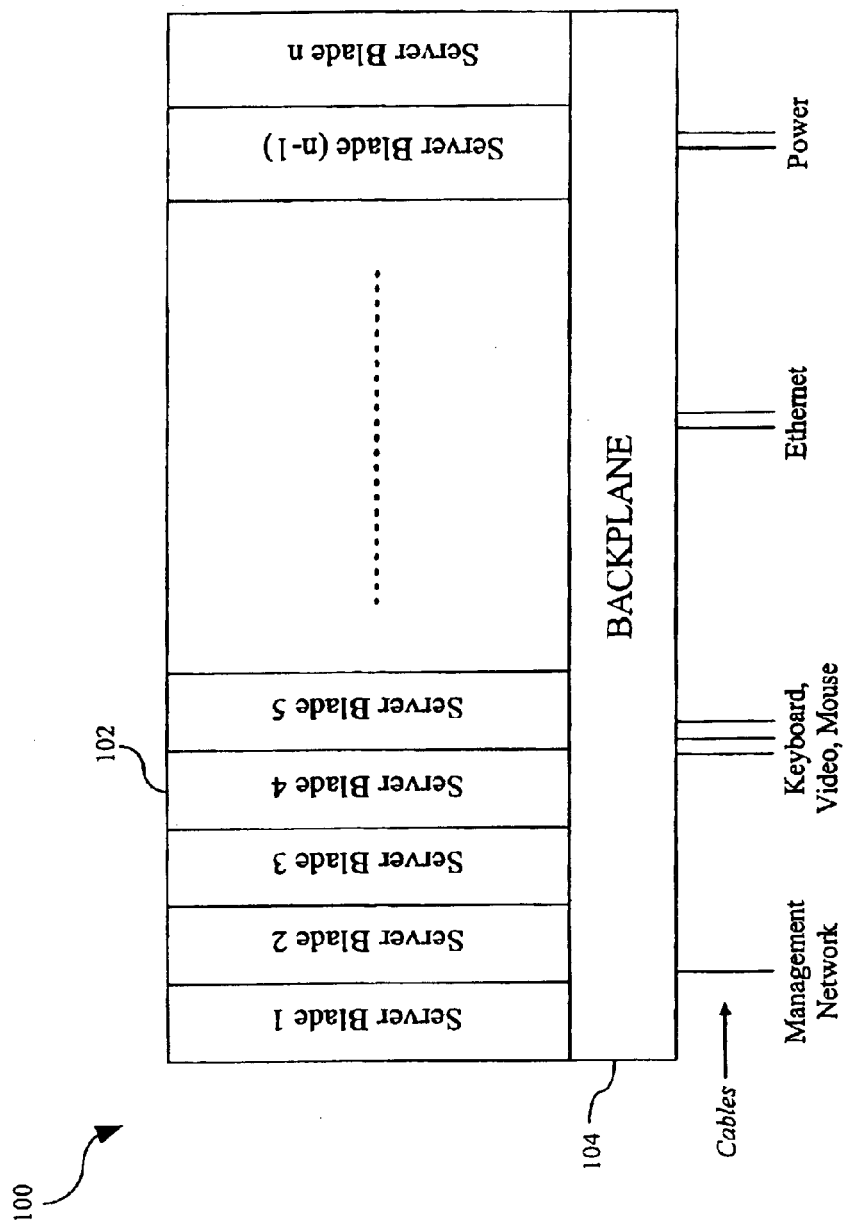
FIG. 1 is a schematic diagram of an exemplary chassis housing multiple server blades in which the present invention may be implemented.

Referring first to FIG. 1, a schematic diagram of an exemplary chassis 100 housing multiple server blades in which the present invention may be implemented is shown. The chassis 100 may house multiple server blades 102 and a backplane 104. Server blades 102 are plugged into the backplane 104. The number of server blades 102 in the chassis 100 may vary. For example, a typical 3u or 5u chassis 100 may house ten to fifteen server blades 102. The chassis 100 may be mounted on a rack (not shown). For example, a typical 6-foot rack in a data center may contain six to eight chassis 100.

Each server blade 102 in the chassis 100 may have its own processor(s), memory, network connections and associated electronics. Each server blade 102 may run its own instance of OS. All the server blades 102 in the chassis 100 may share power, cooling, network access, and storage through the backplane 104. The chassis 100 minimizes the amount of cabling because redundant power supplies are leveraged across multiple server blades 102. In addition, built-in switches consolidate Ethernet data and management networks, and even KVM (keyboard, video, and mouse) connections (see FIG. 1).

Since the present OSs and applications assume that boot/page file storage is closely coupled to the server blade 102, conventionally each server blade 102 may contain a boot volume (not shown). A boot volume may be a single drive for boot, OS, and pagefile. Alternatively, a boot volume may be a RAID volume for boot, OS, and pagefile. The RAID volume may be of any RAID configuration. For example, the RAID volume may be a RAID 1 drive pair, i.e., two identical boot drives for boot, OS, and pagefile. This conventional blade server system architecture results in at least one drive for each server blade 102, consuming precious data center real estate and power supply.

The present invention provides a new blade server system architecture in which a boot volume is shared among two or more server blades 102 in the chassis 100. The boot volume may be located on a server blade 102, or on the backplane 104, or on a separate storage blade. The present invention may reduce the total number of drives in a rack by at least a factor of two, thus saving precious data center real estate and power supply. Moreover, since the boot volume is closely coupled to the server blade 102, the present invention maintains compatibility with current OSs and applications.

It is understood that FIG. 1 is intended as an example of a chassis housing multiple server blades in which the present invention may be implemented and not as an architectural limitation to the present invention. Those of ordinary skill in the art will appreciate that various combinations and arrangements may be employed without departing from the scope and spirit of the present invention.

Figure 2:
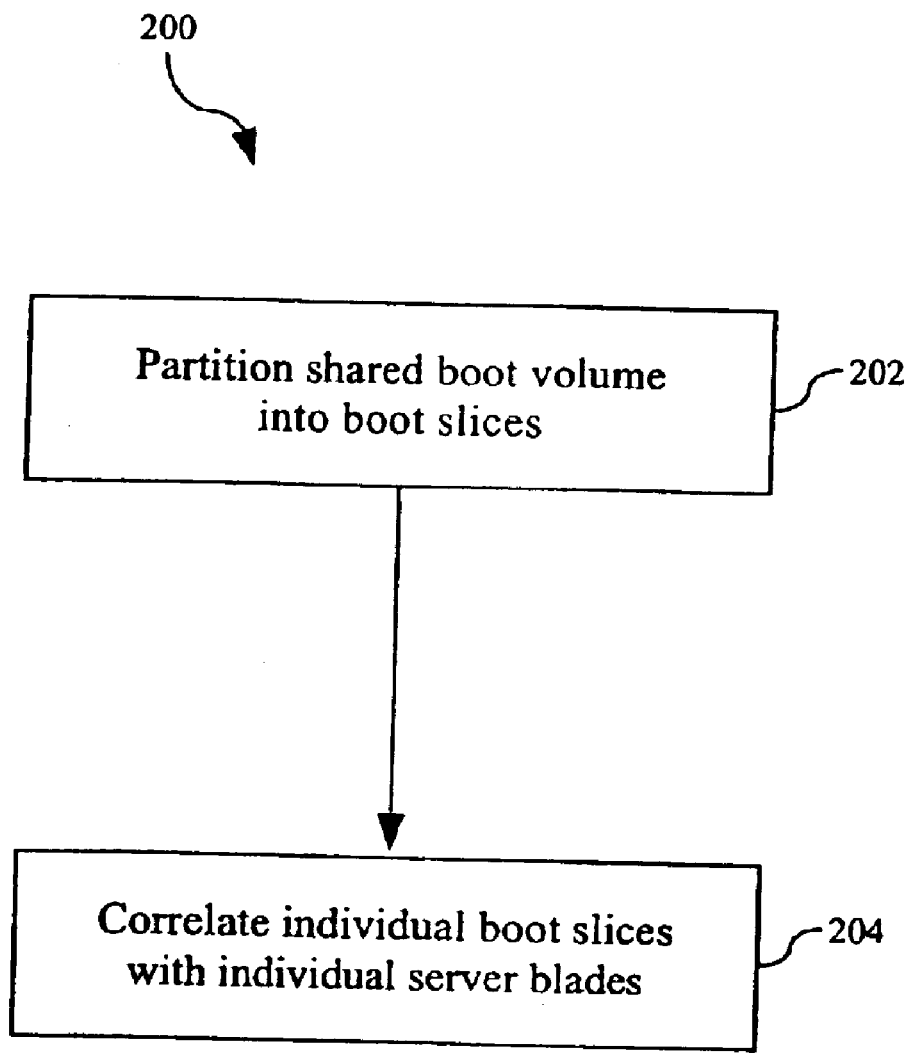
FIG. 2 is a flow chart of an exemplary process used for sharing a boot volume among two or more server blades in a chassis in accordance with the present invention.

Referring to FIG. 2, a flow chart of an exemplary process 200 used for sharing a boot volume among two or more server blades in a chassis in accordance with the present invention is shown. The process 200 starts with the step in which a shared boot volume is partitioned into at least two boot slices 202. For example, if the shared boot volume is to be shared by N server blades, the shared boot volume may be partitioned into N or more boot slices. The number N may vary from two to the maximum number of server blades that fit in a single chassis. Each boot slice may be of equal size. In alternative embodiments, each boot slice may be of different size. The shared boot volume may use multi-initiator drive interfaces such as SCSI (Small Computer System Interface), FC (Fibre Channel), SAS (Serial Attached SCSI), or the like. The shared boot volume may also use dual-port SAS (or FC) drives. The shared boot volume may be a single drive or a RAID volume. The RAID volume may be of any RAID configuration. For example, the RAID volume may be a RAID 1 drive pair so as to take advantage of mirroring to tolerate drive failures. The shared boot volume may be located on a server blade in the chassis or on the backplane of the chassis. The shared boot volume may also be built into a separate "boot storage blade." For example, the chassis may house fifteen server blades and one boot storage blade. Alternatively, every four server blades may require one boot storage blade.

Next, individual boot slices of the shared boot volume are correlated with individual server blades, which share the shared boot volume 204. When a boot slice is correlated with a server blade, the boot slice is presented to the server blade, the server blade sees the boot slice and only the boot slice, and the server blade owns the boot slice. This correlation is transparent to the OS or applications on a given server blade, because the I/O controller masks all boot slices but the one owned by that server blade. As far as OS and applications are concerned, the server blade just has a single boot slice as a dedicated local drive.

Those of ordinary skill in the art will appreciate that even though the exemplary process 200 is described for sharing a boot volume among two or more server blades, the present invention may also be utilized for sharing a boot volume among two or more servers (or clients like workstations).

It is understood that the specific order or hierarchy of steps in the process disclosed are examples of exemplary approaches. Based upon design preferences, it is understood that the specific order or hierarchy of steps in the process may be rearranged while remaining within the scope of the present invention. The accompanying method claims present elements of the various steps in a sample order, and are not meant to be limited to the specific order or hierarchy presented.

Figure 3:
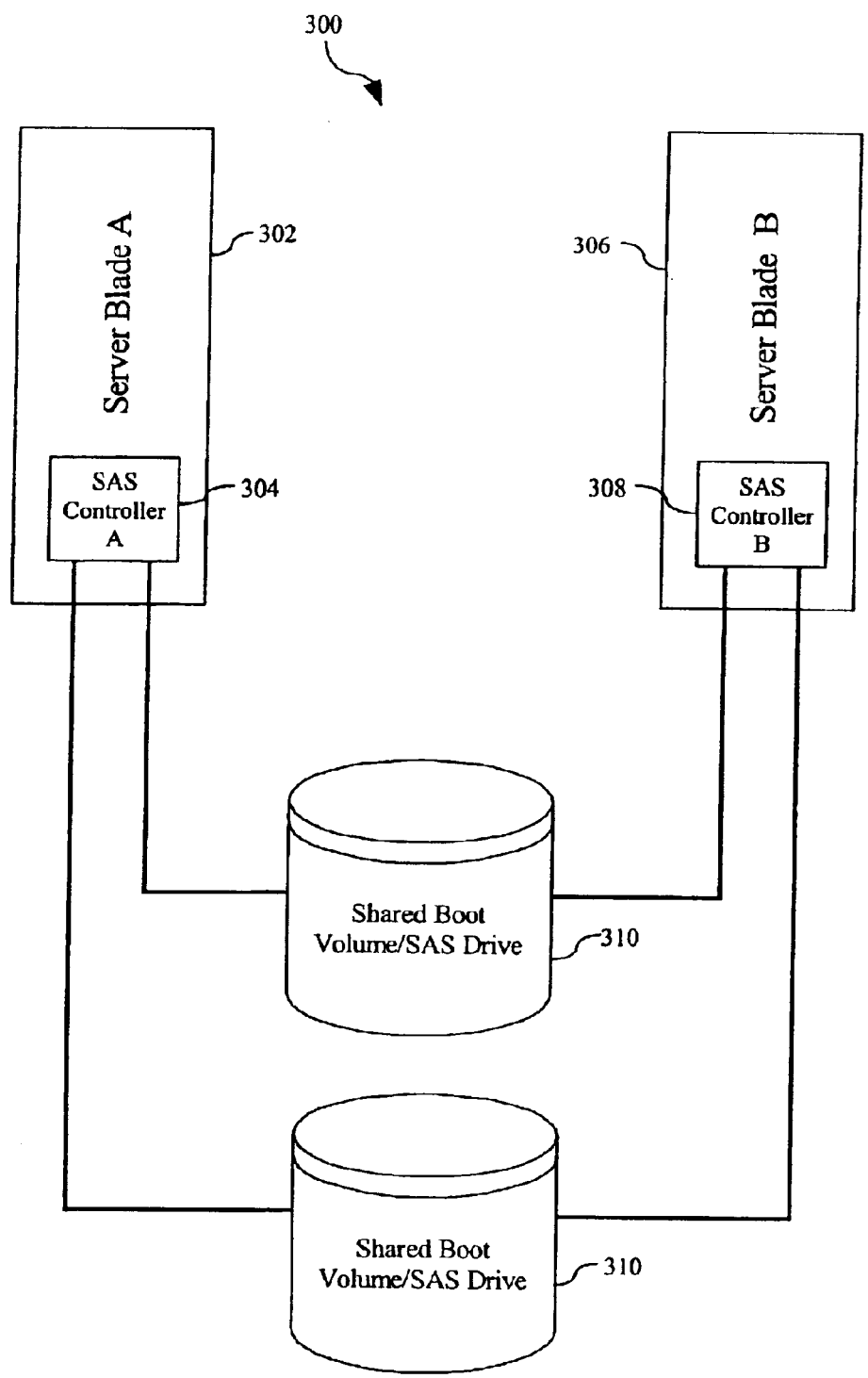
FIG. 3 is an exemplary embodiment of a server blade system architecture in accordance with the present invention.
Figure 4:
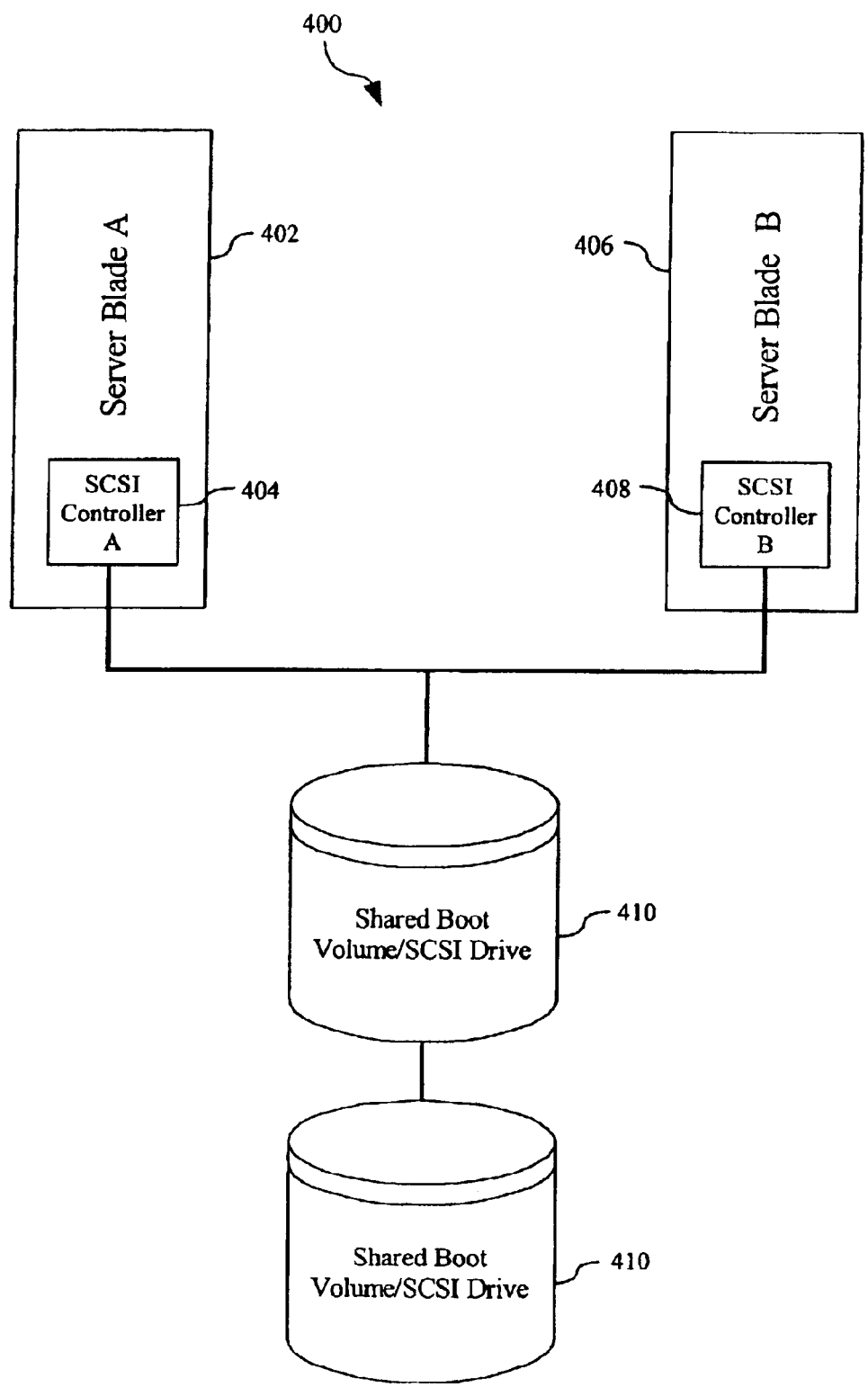
FIG. 4 is an additional exemplary embodiment of a server blade system architecture in accordance with the present invention.
Figure 5:
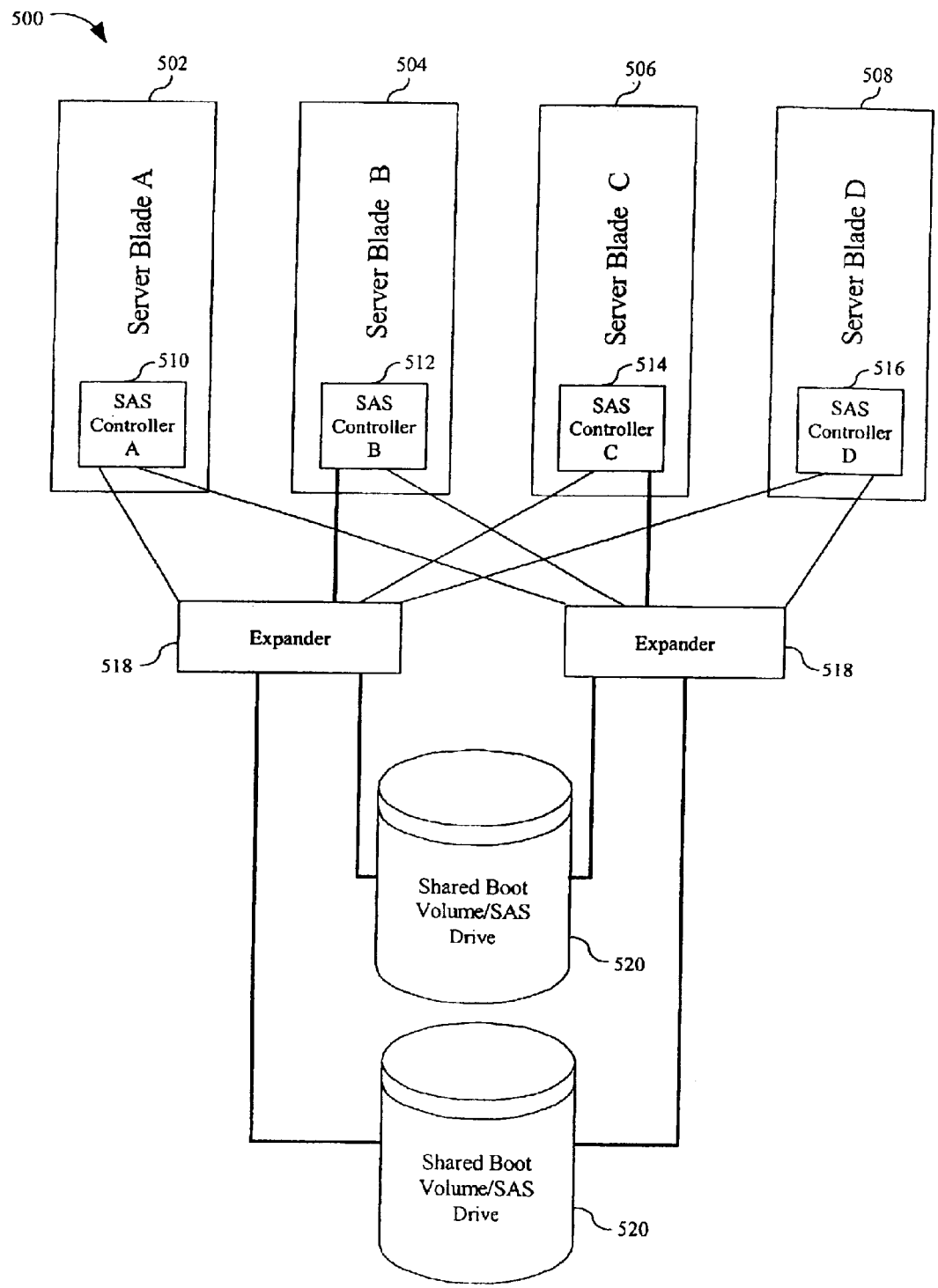
FIG. 5 is a further exemplary embodiment of a server blade system architecture in accordance with the present invention.

Referring generally now to FIGS. 3 through 5, exemplary embodiments of a server blade system architecture in accordance with the present invention are shown. FIG. 3 is an exemplary embodiment of a server blade system architecture 300 in which the process 200 shown in FIG. 2 may be implemented. A chassis (not shown) may house server blade A 302 and server blade B 306, which may share a boot volume 310. The boot volume 310 may be a RAID 1 drive pair. The pair may include two dual-port SAS (or FC) drives.

The boot volume 310 may be partitioned into two boot slices, one correlated with server blade A 302 and the other correlated with server blade B 306. Server blade A 302 may contain SAS controller A 304, which may also be an integrated RAID controller. SAS controller A 304 may mask the boot slice owned by server blade B 306 and present the boot slice owned by server blade A 302 to server blade A 302. Server blade A 302 only sees the boot slice owned by server blade A 302. Similarly, server blade B 306 may contain SAS controller B 308, which may also be an integrated RAID controller. SAS controller B 308 may mask the boot slice owned by server blade A 302 and present the boot slice owned by server blade B 306 to server blade B 306. Server blade B 306 only sees the boot slice owned by server blade B 306.

FIG. 4 is an additional exemplary embodiment of a server blade system architecture 400 in which the process 200 shown in FIG. 2 may be implemented. A chassis (not shown) may house server blade A 402 and server blade B 406, which may share a boot volume 410. The boot volume 410 may be a RAID 1 drive pair. The pair may include two SCSI drives. The boot volume 410 may be partitioned into two boot slices, one correlated with server blade A 402 and the other correlated with server blade B 406. Server blade A 402 may contain SCSI controller A 404, which may also be an integrated RAID controller. SCSI controller A 404 may mask the boot slice owned by server blade B 406 and present the boot slice owned by server blade A 402 to server blade A 402. Server blade A 402 only sees the boot slice owned by server blade A 402. Similarly, server blade B 406 may contain SCSI controller B 408, which may also be an integrated RAID controller. SCSI controller B 408 may mask the boot slice owned by server blade A 402 and present the boot slice owned by server blade B 406 to server blade B 406. Server blade B 406 only sees the boot slice owned by server blade B 406.

FIG. 5 is a further exemplary embodiment of a server blade system architecture 500 in which the process 200 shown in FIG. 2 may be implemented. The architecture 500 may employ MPIO (multi-path I/O). A chassis (not shown) may house server blade A 502, server blade B 504, server blade C 506, and server blade D 508, which may share a boot volume 520 through expanders 518. For example, the expanders 518 may be SAS expanders. The boot volume 520 may be a RAID 1 drive pair. The pair may include two dual-port SAS (or FC) drives. The boot volume 520 may be partitioned into four boot slices, one each for Server blade A 502, server blade B 504, server blade C 506, and server blade D 508. Server blade A 502 may contain SAS controller A 510, server blade B 504 may contain SAS controller B 512, server blade C 506 may contain SAS controller C 514, and server blade D 508 may contain SAS controller D 516. SAS controllers A 502, B 504, C 506 and D 508 may also be integrated RAID controllers. Each of SAS controllers A 502, B 504, C 506 and D 508 may mask all boot slices but the one owned by the server blade which houses the SAS controller, and each server blade only sees the boot slice owned by it.

In FIGS. 3 through 5, even though the controllers are shown on each server blade, the controllers or the boot volume or both may also be built into the backplane of the chassis or be built into a separate "boot storage blade." For example, the chassis may house fifteen server blades and one boot storage blade. Alternatively, every four server blades may require one boot storage blade.

The present invention resolves the tension between two fundamentally conflicting objectives: the desire to reduce the number of drives, and associated real estate and power consumption in a chassis housing multiple server blades, and the desire to maintain compatibility with OSs and applications, which assume closely coupled "per server" storage, and which depend upon this close coupling to function. The present invention does so while preserving the benefits of RAID, specifically the ability to tolerate drive failures. Moreover, the present invention exploits the rapid increase in per-drive capacity, significantly improving capacity utilization. Furthermore, the present invention allows a range of price/performance/capacity trade-offs, depending on the number of server blades that share a single boot volume.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for sharing a boot volume among server blades, comprising:
   partitioning said boot volume into at least two boot slices; and
   correlating an individual boot slice of said at least two boot slices with an individual server blade of said server blades,
   wherein said boot volume is positioned on at least one of a backplane into which said server blades are inserted, a boot storage blade which is inserted into said backplane, or one of said server blades.

2. The method of claim 1, wherein each of said at least two boot slices is of equal size.

3. The method of claim 1, wherein a number of said at least two boot slices is equal to a number of said server blades.

4. The method of claim 3, wherein each of said at least two boot slices is correlated with a different server blade of said server blades.

5. The method of claim 1, wherein said boot volume uses a multi-initiator drive interface.

6. The method of claim 1, wherein said boot volume uses dual-port SAS drives.

7. The method of claim 1, wherein said boot volume uses dual-port FC drives.

8. The method of claim 1, wherein said boot volume is a RAID 1 drive pair.

9. An apparatus for sharing a boot volume among server blades, comprising:
   means for partitioning said boot volume into at least two boot slices; and
   means for correlating an individual boot slice of said at least two boot slices with an individual server blade of said server blades,
   wherein said boot volume is positioned on at least one of a backplane into which said server blades are inserted, a boot storage blade which is inserted into said backplane, or one of said server blades.

10. The apparatus of claim 9, wherein each of said at least two boot slices is of equal size.

11. The apparatus of claim 9, wherein a number of said at least two boot slices is equal to a number of said server blades.

12. The apparatus of claim 11, wherein each of said at least two boot slices is correlated with a different server blade of said server blades.

13. The apparatus of claim 9, wherein said boot volume uses a multi-initiator drive interface.

14. The apparatus of claim 9, wherein said boot volume uses dual-port SAS drives.

15. The apparatus of claim 9, wherein said boot volume uses dual-port FC drives.

16. The apparatus of claim 9, wherein said boot volume is a RAID 1 drive pair.

17. An apparatus for sharing a boot volume among at least two server blades, comprising:
   a backplane into which said at least two server blades are inserted;
   a boot volume partitioned into boot slices; and
   an I/O controller which correlates an individual boot slice of said boot slices with an individual server blade of said at least two server blades,
   wherein said boot volume is positioned on at least one of said backplane, a boot storage which is inserted into said backplane, or one of said at least two server blades.

18. The apparatus of claim 17, wherein said I/O controller is positioned on said backplane.

19. The apparatus of claim 17, wherein said I/O controller is positioned on said of said at least two server blades.

20. The apparatus of claim 17, wherein said I/O controller is positioned on said boot storage blade which is inserted into said backplane.

21. The apparatus of claim 17, wherein said I/O controller is a RAID controller.

22. The apparatus of claim 21, wherein said I/O controller is a SCSI controller.

23. The apparatus of claim 21, wherein said I/O controller is a SAS controller.

24. The apparatus of claim 23, wherein said I/O controller is coupled to said boot volume through a SAS expander.

* * * * *